United States Patent
Amin et al.

[11] Patent Number: 5,699,605
[45] Date of Patent: Dec. 23, 1997

[54] METHOD FOR FORMING A MAGNETIC THIN FILM HEAD WITH RECESSED BASECOAT

[75] Inventors: Nurul Amin, Burnsville, Minn.; John Bortins, Goleta; Ying Yan, San Jose, both of Calif.

[73] Assignee: Seagate Technology, Inc., Scotts Valley, Calif.

[21] Appl. No.: 421,429

[22] Filed: Apr. 12, 1995

Related U.S. Application Data

[62] Division of Ser. No. 247,524, May 23, 1994.

[51] Int. Cl.$^6$ .................................................. G11B 5/42
[52] U.S. Cl. .................. 29/603.14; 360/123; 360/126
[58] Field of Search .................. 29/603.14, 603.13; 360/123, 126

[56] References Cited

U.S. PATENT DOCUMENTS

| | | | |
|---|---|---|---|
| 4,281,357 | 7/1981 | Lee | 360/125 |
| 4,517,616 | 5/1985 | Bischoff | 360/126 |
| 4,684,438 | 8/1987 | Lazzari | 156/649 |
| 4,819,111 | 4/1989 | Keel et al. | 360/125 |
| 4,838,992 | 6/1989 | Abraham | 156/653 |
| 4,853,815 | 8/1989 | Diepers | 360/126 |
| 4,872,079 | 10/1989 | Roberts | 360/126 |
| 4,878,290 | 11/1989 | Masud et al. | 29/603 |
| 4,896,417 | 1/1990 | Sawada et al. | 29/603.14 |
| 4,919,748 | 4/1990 | Bredbenner et al. | 156/643 |
| 4,944,831 | 7/1990 | Sibuet | 156/643 |
| 4,944,836 | 7/1990 | Beyer et al. | 156/645 |
| 4,949,207 | 8/1990 | Lazzari | 360/119 |
| 4,970,615 | 11/1990 | Gau | 360/122 |
| 4,992,901 | 2/1991 | Keel et al. | 360/110 |
| 5,084,957 | 2/1992 | Amin et al. | 29/603 |

OTHER PUBLICATIONS

Cross Section of IBM Head of Jan. 20, 1989.
Two Cross Sections of Yamaha Head of Sep. 1989.
Cross section of AMC Head of Sep. 18, 1990.

*Primary Examiner*—Carl E. Hall
*Attorney, Agent, or Firm*—Westman, Champlin & Kelly, P.A.

[57] ABSTRACT

A thin film magnetic head is carried in a recessed region which is etched in a basecoat. The thin film magnetic head includes upper and lower pole pieces having an upper pole tip and a lower pole tip, respectively. The upper and lower pole tips form a magnetic flux gap. Electrical conductors are carried in an insulating layer between the upper and lower pole pieces. The magnetic flux gap defines a plane which is generally parallel with a plane defined by the conductors. The electrical conductors lie on either side of the plane.

9 Claims, 4 Drawing Sheets

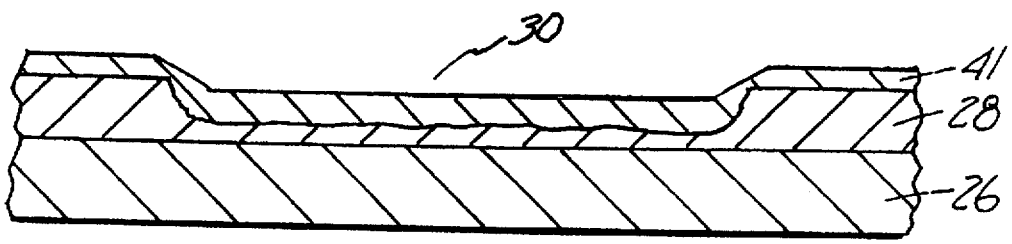
Fig. 3E
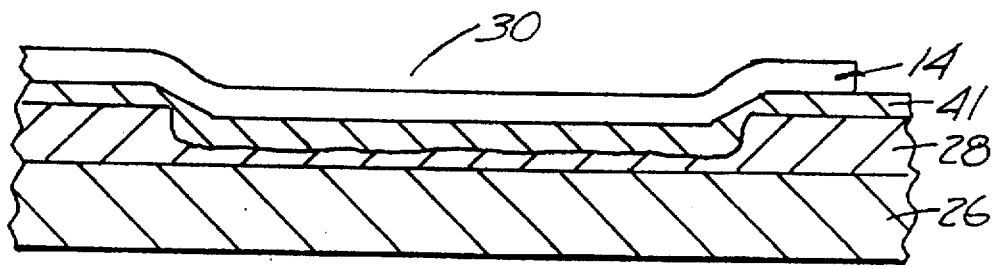
Fig. 3F
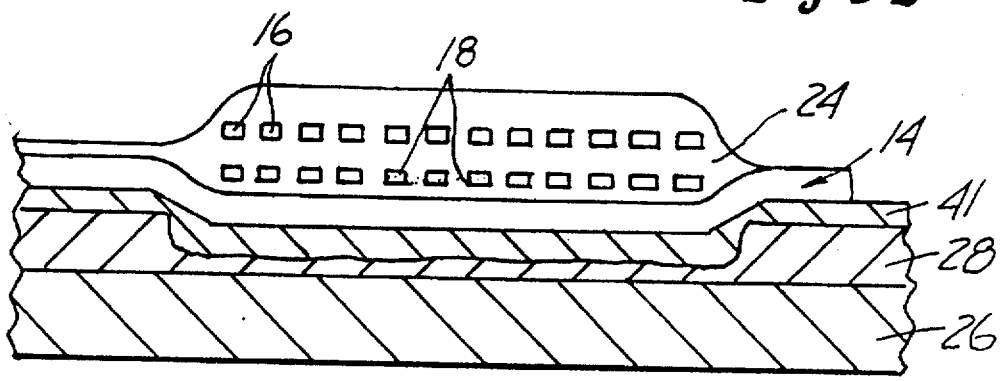
Fig. G
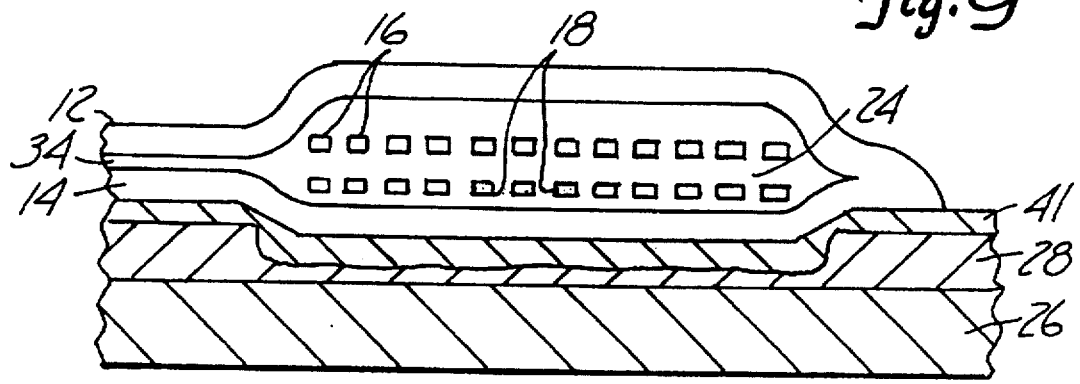
Fig. H

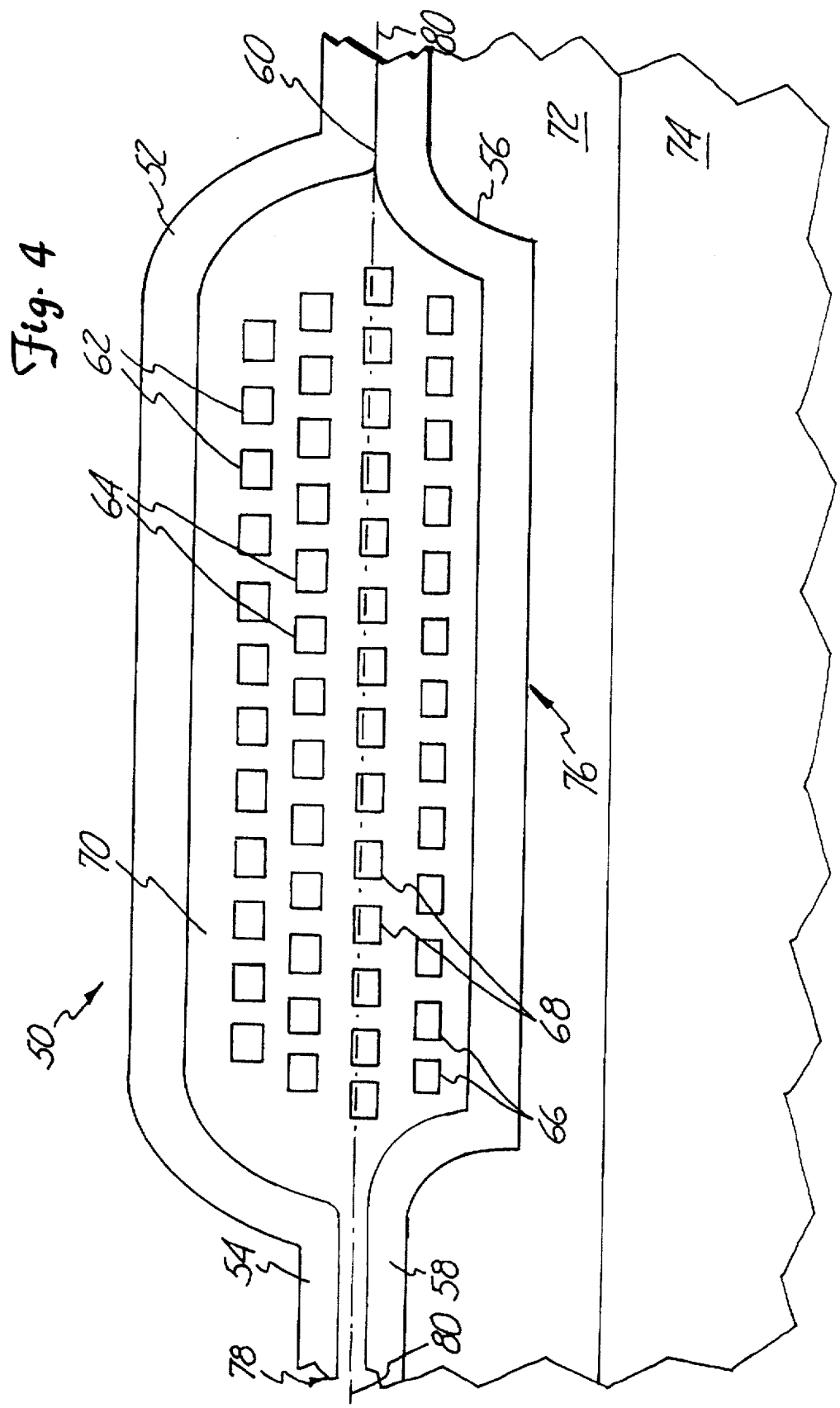

METHOD FOR FORMING A MAGNETIC THIN FILM HEAD WITH RECESSED BASECOAT

This is a divisional of application Ser. No. 08/247,524, filed May 23, 1994.

BACKGROUND OF THE INVENTION

The present invention relates to the production of thin film magnetic heads. In particular, the invention relates to a thin film head with a recessed basecoat.

Thin film magnetic read/write heads are used for magnetically reading and writing information upon a magnetic storage medium such as a magnetic disc or magnetic tape. A thin film head consists of two thin film pole pieces and a coiled conductor in between. These two pole pieces taper into pole tips separated by a gap of non-magnetic material. It is desirable to make more space available for the coils in this design. It is also desirable to improve the symmetry of the coil about the gap.

The demand for increased storage density in magnetic storage media has led to reduced magnetic head dimensions. Magnetic heads are now fabricated in a manner similar to that used for semiconductor integrated circuits in the electronics industry.

During fabrication, many thin film magnetic heads are deposited across the surface of a wafer (or substrate). After the layers are deposited, the wafer is sliced into many individual thin film heads, each carried by a portion of the wafer so that an upper pole tip, a lower pole tip, and a gap are exposed. The pole tips, gap, and a portion of the substrate which underlies them are then lapped in a direction generally inward, toward the center of the thin film head, to achieve the desired dimensions. This lapping process is a grinding process in which the exposed portion of the top and bottom pole tips and the gap are applied to an abrasive such as a diamond slurry. Electrical contacts are connected to conductive coils. The completed head is attached to a carrying fixture (such as an air bearing slider) for use in reading and writing data on a magnetic storage medium such as a computer disc.

SUMMARY OF THE INVENTION

The present invention provides improved performance characteristics in a thin film magnetic head by recessing a lower pole piece into a basecoat, such that a portion of a coil is on either side of a plane defined by a transducer gap. The head is generally symmetrical about this plane.

The recess is formed by depositing the basecoat upon a substrate and masking around the recess with a photoresist mask. The basecoat is then chemically etched in those areas not covered by the photoresist mask, creating the recessed region. Then, a second layer of basecoat is deposited and give an angle to the recess wall. The lower pole piece is deposited in the recessed region of the basecoat. The lower pole piece includes a lower pole tip which forms part of the transducer gap. Insulating material containing a plurality of electrical conductors is deposited upon the lower pole piece, such that some of the conductors are located on one side of the plane and some are located on the other side of the plane defined by the transducer gap. An upper pole piece is then deposited upon the insulating material. The upper pole piece includes an upper pole tip. The upper and lower pole tips form the transducer gap. The electrical conductors form a plurality of coils which are generally symmetric about the plane defined by the transducer gap.

BRIEF DESCRIPTION OF THE DRAWINGS

FIG. 3E shows the substrate and basecoat of FIG. 3D with an additional layer of basecoat.

FIG. 3F shows the substrate and basecoat of FIG. 3E following deposition of a lower pole piece.

FIG. 3G shows the substrate, basecoat, and lower pole piece of FIG. 3F following deposition of insulating material containing electrical conductors.

FIG. 3H shows the substrate, basecoat, lower pole piece, and insulating material of FIG. 3G following deposition of an upper pole piece.

FIG. 4 is a cross-sectional view of another embodiment of the invention.

DETAILED DESCRIPTION OF THE PREFERRED EMBODIMENTS

Figure 1:
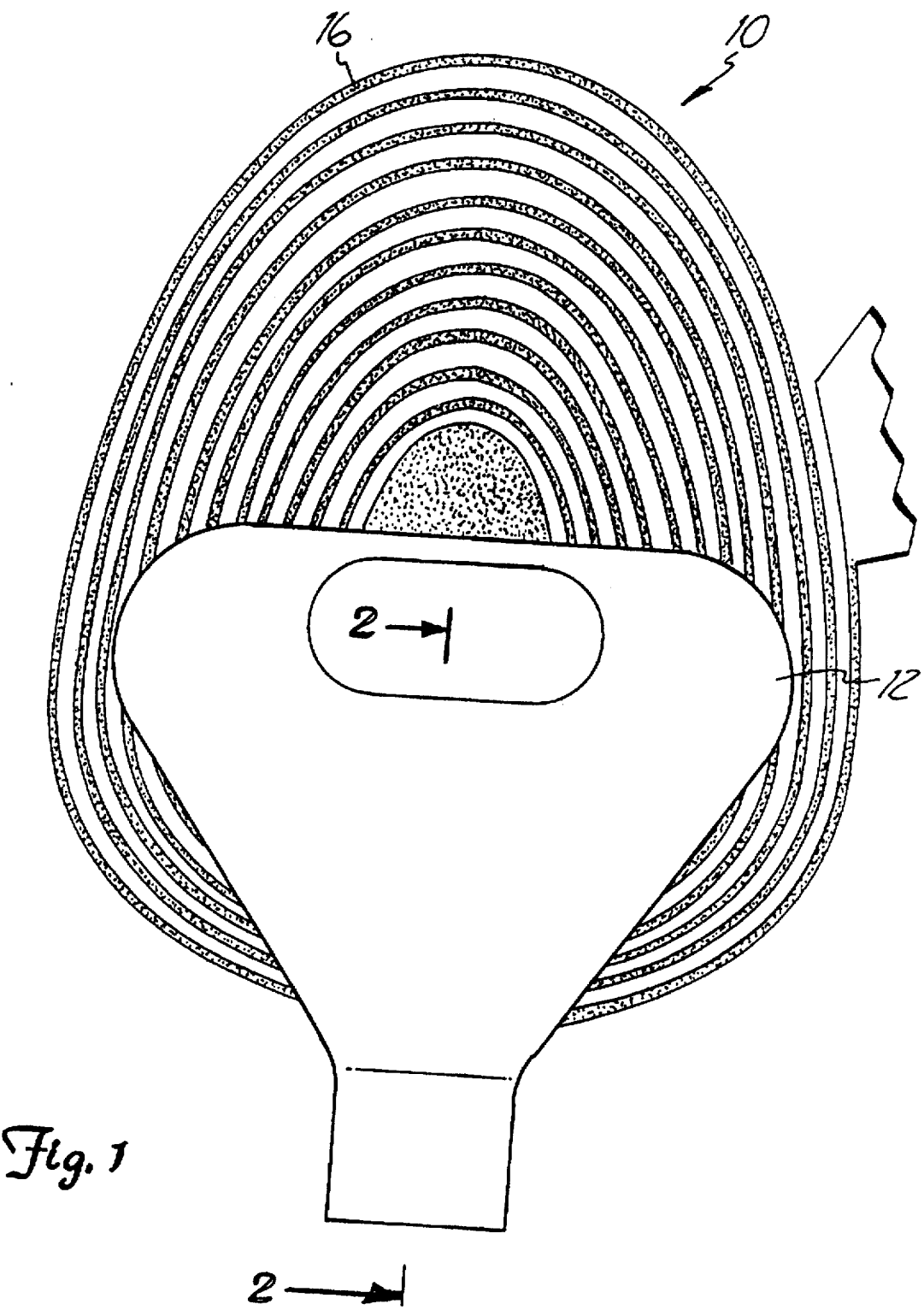
FIG. 1 shows a top view of a thin film magnetic read/write head.
Figure 2:
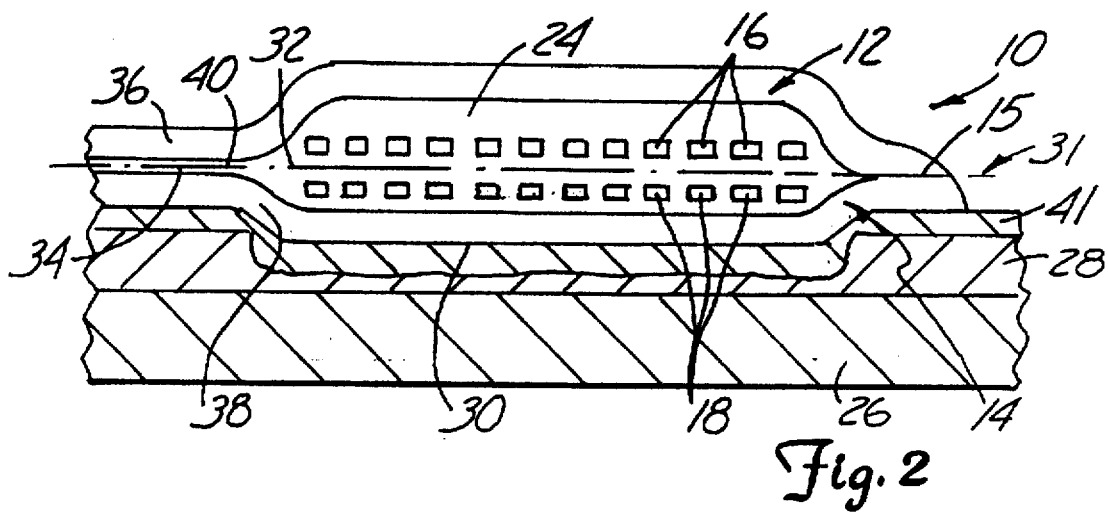
FIG. 2 is a side cross-sectional view of the thin film magnetic head of FIG. 1 taken along line 2—2.

A multi-turn inductive thin film magnetic head 10 is shown schematically in FIGS. 1 and 2. FIG. 1 is a top view of thin film head 10 and FIG. 2 is a side cross-sectional view. Thin film head 10 includes upper pole piece 12 including upper pole tip 36, and lower pole piece 14 including lower pole tip 38. The portions of pole pieces 12 and 14 which are not part of tips 36 and 38 are referred to as the legs of pole pieces 12 and 14, respectively. Upper pole piece 12 and lower pole piece 14 contact each other at back gap "via" 15 and form the two poles of magnetic head 10. Conductors 16 and 18 extend between upper pole piece 12 and lower pole piece 14, contained within insulating material 24. Conductors 16 and 18 form elliptical coils. Insulating material 24 electrically insulates conductors 16 and 18 from upper and lower pole pieces 12 and 14.

Thin film head 10 is deposited upon nonmagnetic substrate 26, which includes basecoat 28 having recessed region 30 formed by an etching process described below. Recessed region 30 allows the portion of lower pole piece 14 which carries conductors 16, 18, 20, and 22 to sit below the plane of basecoat 28. This additional space preferably accommodates conductors 16 and 18 of a relatively greater thickness than in prior art designs and allow a larger number of windings of conductors 16–22. Upper and lower pole pieces 12 and 14 are between about 1 micron and about 5 microns. In one embodiment, the depth of recessed region 30 is about equal to the thickness of lower pole piece 14.

As depicted in FIG. 2, the top surface of basecoat 28 defines a plane and recessed region 30 dips below the plane. Additionally, gap 34 defines plane 31 which is parallel with a plane defined by conductor 16 or 18. Plane 31 slices through head 10 and bisects back gap via 15. In accordance with the invention, head 10 is generally symmetrical about plane 31. That is, the portion of head 10 that is above plane 31 is generally a mirror image of the portion below plane 31. Therefore, conductors 16 lie above plane 31 while conductors 18 lie below plane 31. Prior art designs lack the symmetry achieved by the present invention and do not provide additional room for more coils.

FIGS. 3A–3G illustrate a process for manufacturing thin film head 10 in accordance with the present invention. In fabricating thin film head 10, several separate pattern transfer processes are used. These transfer processes include chemical etching, plating, and sputtering. A typical head fabrication process may account for more than a dozen masking levels and more than thirty processing steps.

Figure 3A:
FIG. 3A is a cross-sectional side view of a non-magnetic substrate.
Figure 3B:
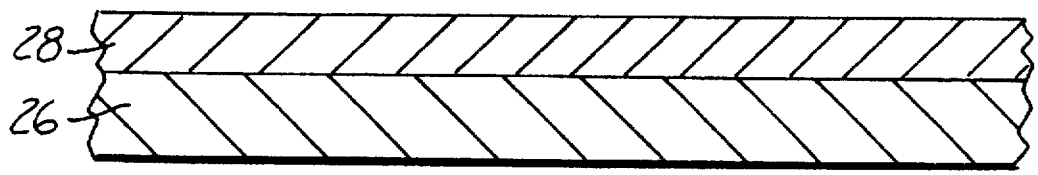
FIG. 3B shows the substrate of FIG. 3A with an added basecoat.

FIG. 3A shows a cross-sectional side view of non-magnetic substrate 26, typically comprising a ceramic compound such as $Al_2O_3$—TiC. Basecoat 28, typically made of alumina, is then deposited upon the substrate 26 as shown in FIG. 3B. The surface of basecoat 28 is polished and a copper seed layer (not shown) having a thickness of about 1000 Å is sputtered onto the polished surface.

Figure 3C:
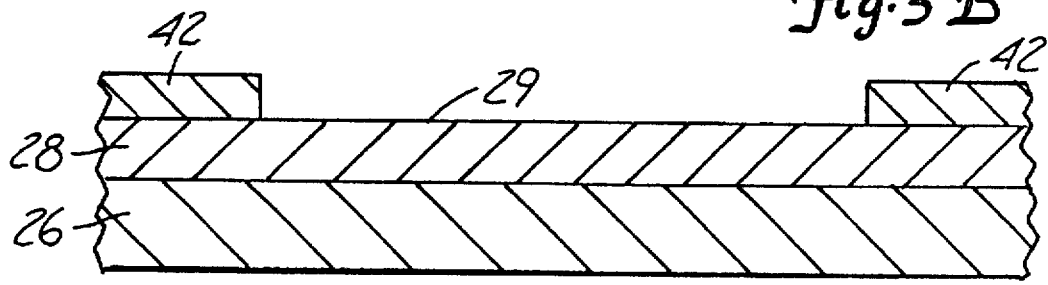
FIG. 3C shows the substrate and basecoat of FIG. 3B with a photoresist mask.

In FIG. 3C photoresist mask 42 is applied to the copper seed layer (not shown) over basecoat 28, except for region 29 to be recessed. Photoresist mask 42 is formed by depositing a layer of photoresist across basecoat 28. A portion of the photoresist layer is exposed to ultraviolet radiation, and a chemical etch removes the portion of the photoresist layer which was exposed to the radiation. This exposes region 29. The copper seed layer is etched using a chemical solution of hydrogen peroxide and phosphoric acid to expose alumina basecoat 28.

Figure 3D:
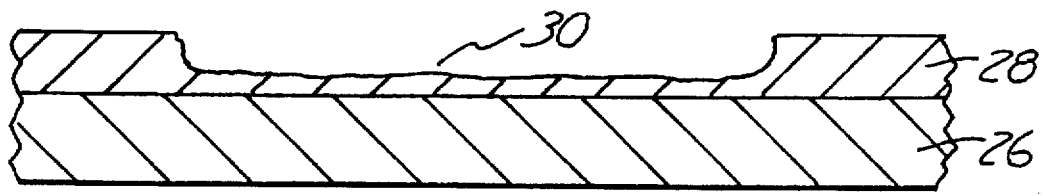
FIG. 3D shows the substrate and basecoat of FIG. 3C following etching and removal of the photoresist mask.

Recessed region 30 is formed by a chemical etching process which attacks only exposed basecoat 28, (for example, this can comprise a 10% solution of hydrofluoric acid in water) and photoresist mask 42 is removed by another selective chemical etch, which attacks only photoresist mask 42. As FIG. 3D shows, recessed region 30 typically has rough edges and vertical walls, which are preferably smoothened by an encapsulation layer 41 (shown in FIG. 3E) which is a sputtered layer of alumina. The electrical bias and gas pressure applied during the sputtering process changes characteristics of the encapsulation layer. During sputtering, the rough edges are filled. Additionally, the corners are filled relatively faster than the flatter surfaces. This provides a smooth surface having sloping edges. Layer 41 changes the slope of the walls of recessed region 30 from about 90° to almost 45°. Layer 41 acts as a second basecoat layer.

If straighter edges are desired, a milling process is preferably used. The milling process preferably comprises ion milling, in which argon or xenon ions are produced by anion source, accelerated by an electric field through an electrified grid and aimed at the surface of basecoat 28. During the milling process, a sacrificial mask (not shown) protects portions of basecoat 28 from the energetic ions.

In FIG. 3F, lower pole piece 14 is deposited into recessed region 30 of basecoat 28 using photolithographic techniques. As shown in FIG. 3G, insulating material 24 and conductors 16 and 18 are deposited on lower pole piece 14. Insulating material 24 and conductors 16 and 18 are also patterned using lithography.

FIG. 3H shows the deposition of upper pole piece 12 upon insulating layer 24 and lower pole piece 14. Upper pole piece 12 completes a magnetic flux circuit between upper and lower pole pieces 12 and 14 across gap 34. Upper pole piece 12 and lower pole piece 14 are typically comprised of magnetic thin films such as nickel iron (NiFe). Photolithography is used to define the geometry of both upper pole piece 12 and lower piece 14.

Thin film head 10 is ultimately a component of a slider mechanism (not shown) which "flies" over the surface of a magnetic storage disc (not shown). Head 10 is used to read and write magnetically encoded information onto a surface of the disc.

In operation, upper pole tip 36 and lower pole tip 38 are positioned near a moving magnetic storage medium (not shown). During a read operation, changing magnetic flux of the moving storage medium impresses a corresponding changing magnetic flux upon upper pole tip 36 and lower pole tip 38. The magnetic flux is carried through upper pole piece 12 and lower pole piece 14 around conductors 16 and 18. The changing magnetic flux induces an electrical voltage across conductors 16 and 18 which may be detected with electrical detection circuitry (not shown). The electrical voltage is representative of the changing magnetic flux produced by the moving magnetic storage medium.

During a write operation, an electric current is caused to flow in conductors 16 and 18. This electric current induces a magnetic field in upper pole piece 12 and lower pole piece 14, and causes a magnetic field across gap 34 between upper pole tip 36 and lower pole tip 38. A magnetic fringe field extends in the vicinity beyond upper pole tip 36 and lower pole tip 38, and into the nearby magnetic storage medium. This fringe field is used to impress magnetic fields upon the storage medium and write magnetically encoded information.

FIG. 4 is a cross-sectional diagram of another embodiment of the present invention. FIG. 4 shows a cross section of thin film magnetic head 50. Thin film head 50 includes upper pole 52 having upper pole tip 54 and lower pole piece 56 having lower pole tip 58. Upper pole piece 52 and lower pole piece 56 are in contact at back gap "via" 60 and form the two poles of magnetic head 50. Conductors 62, 64, 66, and 68 extend between upper pole piece 52 and lower pole piece 56. Conductors 62 through 68 are coiled in an elliptical shape similar to coil 16 shown in FIG. 1. Conductors 62 through 68 are carried in insulating material 70. Insulating material 70 electrically insulates conductors 62 through 68 from upper and lower pole pieces 52 and 56 and from each other.

Thin film head 50 is deposited upon basecoat 72 which is carried on non-magnetic substrate 74. Basecoat 72 includes a recessed area 76 in accordance with the present invention. Pole tips 54 and 58 form a magnetic flux gap 78.

Magnetic flux gap 78 defines a plane 80 through magnetic head 50. Plane 80 is generally parallel with a plane defined by conductors 62, 64, 66, or 68. In accordance with the invention, thin film head 50 is generally mirror image symmetrical about plane 80. Therefore, conductors 62 and 64 lie above plane 80 while conductors 66 and 68 lie below plane 80.

The design of thin film head 50 shown in FIG. 4 is similar to the design of thin film head 10 shown in FIG. 2. Both are thin film heads which are set in a recessed area of the basecoat in accordance with the present invention. However, thin film head 50 includes more than two sets of conductor coils. Variations on the present invention include using an odd number of conductor coils. If an odd number of conductor coils are used, one set of conductors should lie above the plane defined by the transducing gap, one set should lie below the plane, and a single conductor coil should lie in the plane.

Additional space in the thin film head of the invention created by the recess in the basecoat permits the use of relatively thicker conductors than in prior art designs. The thickness of the conductors is inversely related to their electrical resistance. Therefore, increasing the thickness of the conductors results in reduced noise during readback.

The improved symmetry of the conductors about the gap results in several improved performance characteristics. For example, during readback, an undesired "undershoot" can cause interference between adjacent bits of information. The undershoot is a brief dip in the readback signal which occurs just before or just after the true position of a data pulse. It has been discovered that the present invention provides reduced undershoots during readback.

The invention also reduces stress in the upper pole piece yielding less magnetic noise. Variation in the upper pole piece composition is diminished, and magnetic flux leakage across a throat region of the gap is reduced, producing better efficiency.

Although the present invention has been described with reference to preferred embodiments, workers skilled in the art will recognize that changes may be made in form and detail without departing from the spirit and scope of the invention. For example, any number of conductors may be used, or other materials may be used to form the head.

What is claimed is:

1. A method of forming a thin film magnetic head, comprising:

depositing a basecoat on a substantially planar substrate;

forming a recessed region in the basecoat, wherein the recessed region has a depth;

depositing a magnetic bottom pole piece having a bottom pole leg and a bottom pole tip on th basecoat, wherein the bottom pole leg is deposited in the recessed region of the basecoat;

depositing insulating material on the magnetic bottom pole piece, wherein the insulating material has a plurality of electrical conductors extending therethrough; and depositing a magnetic upper pole piece having an upper pole leg overlying the bottom pole leg and an upper tip overlying the bottom pole tip forming a transducing gap for reading and writing magnetically encoded information, wherein the transducing gap defines a plane through the thin film magnetic head and the upper and bottom pole pieces are generally symmetric about the plane.

2. The method of claim 1 wherein depositing the magnetic bottom pole piece comprises depositing the magnetic bottom pole piece to a thickness approximately equal to the depth of the recessed region.

3. The method of claim 1 wherein forming a recessed region comprises:

depositing a mask on the basecoat;

removing an exposed portion of the basecoat through the mask; and removing the mask.

4. The method of claim 1 wherein removing an exposed portion of the basecoat comprises applying a chemical etch.

5. The method of claim 1 wherein removing an exposed portion of the basecoat comprises ion milling the basecoat.

6. The method of claim 1 including depositing a film in the recessed region whereby the shape of the recessed region is altered.

7. The method of claim 6 wherein depositing a film comprises sputtering a film.

8. The method of claim 1 including depositing a second basecoat layer in the recessed region whereby slope of side walls of the recessed region are increased.

9. The method of claim 1 wherein the step of forming a recessed region in the basecoat includes forming sides that are substantially perpendicular to the plane of the substrate; and further comprising the step of depositing an encapsulation layer over the basecoat in the recessed region, the encapsulation layer having an outer surface with sloping sides which form an angle with the plane of the substrate of substantially less than ninety degrees.

* * * * *

UNITED STATES PATENT AND TRADEMARK OFFICE
CERTIFICATE OF CORRECTION

PATENT NO. : 5,699,605
DATED : December 23, 1997
INVENTOR(S) : Nurul Amin et al.

It is certified that error appears in the above-indentified patent and that said Letters Patent is hereby corrected as shown below:

On the title page,
Under [62] Related U.S. Application Data insert which is a continuation of Ser. No. 08/001,031, January 6, 1993--.

Col. 1, line 6, after "filed May 23, 1994" insert --, which is a File Wrapper Continuation of application Serial No. 08/001,031, filed January 6, 1993--.

Col. 5, line 28, change "th" to --the--.

Signed and Sealed this

Fourteenth Day of April, 1998

Attest:

BRUCE LEHMAN

*Attesting Officer*         *Commissioner of Patents and Trademarks*